A. B. SHARP.
Car-Starter.

No. 162,957.

Patented May 4, 1875.

WITNESSES:
W. W. Hollingsworth
John C. Kenon

INVENTOR:
A. B. Sharp
BY
ATTORNEYS.

THE GRAPHIC CO. PHOTO-LITH. 39 & 41 PARK PLACE, N.Y.

UNITED STATES PATENT OFFICE.

ABSALOM B. SHARP, OF PLAQUEMINE, LOUISIANA.

IMPROVEMENT IN CAR-STARTERS.

Specification forming part of Letters Patent No. 162,957, dated May 4, 1875; application filed April 5, 1875.

*To all whom it may concern:*

Be it known that I, ABSALOM B. SHARP, of Plaquemine, in the parish of Iberville and State of Louisiana, have invented a new and Improved Car Stopper and Starter; and I do hereby declare that the following is a full, clear, and exact description of the same, reference being had to the accompanying drawing, forming a part of this specification, in which—

Figure 1:
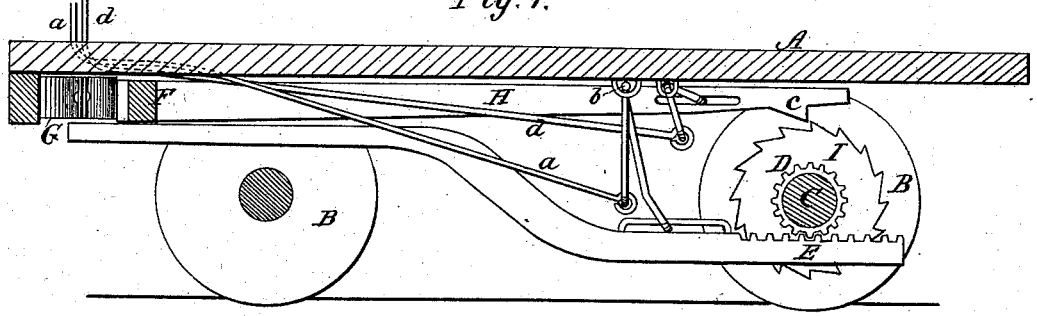
Figure 2:
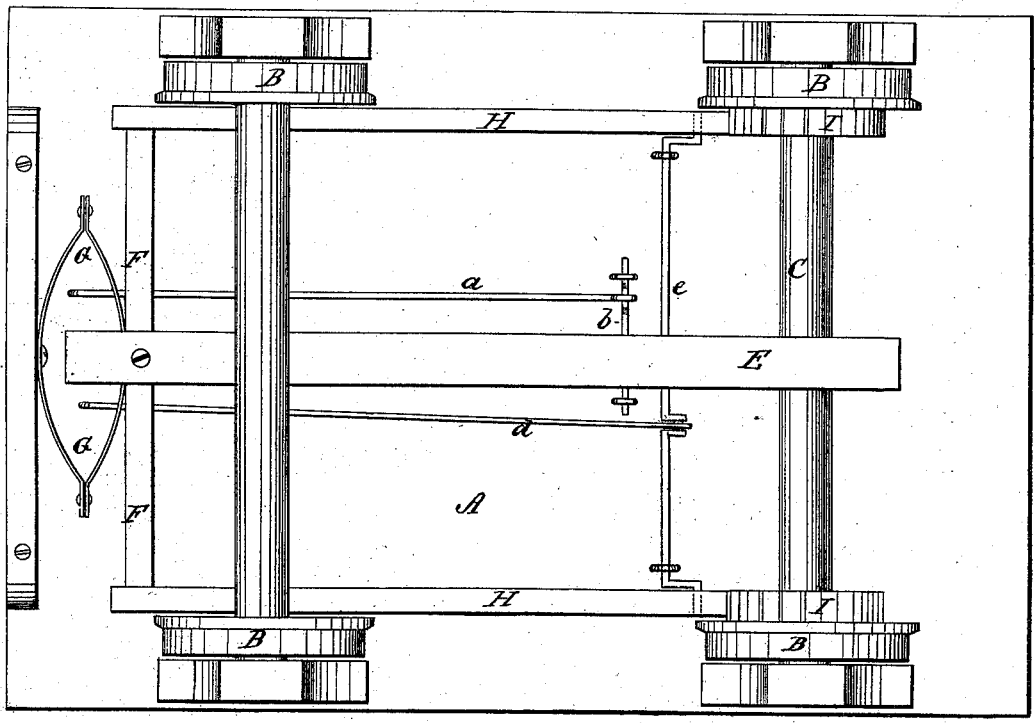

Figure 1 is a vertical section, and Fig. 2 an inverted plan view.

The object of this invention is to utilize the power employed to stop a railway-car by using the same to start the car. It consists in a rack which is made to mesh with a pinion upon the axle of the car-wheel by means of a hand-lever and crank-shaft, the said rack being attached to a frame-work that compresses a spring to form the brake. The frame-work is provided with pawls, which may be made to engage by a second hand-lever with ratchet-wheels upon the car-wheels, and the said pawls are located upon the opposite side of the axle from the rack, so that after the pawls are applied and the rack released from the pinion, the pressure of the spring is shifted to the opposite side of the car-axle, and the car urged forward in the same direction in which it was going previous to applying the brake.

In the drawing, A represents the floor or bottom part of the car, and B are the wheels. Upon one of the axles C is formed a pinion, D, with which a rack-bar, E, may be made to engage by means of the hand-lever $a$ and the connecting crank-shaft $b$. The rack-bar E is preferably placed beneath the axle carrying the pinion, and is bent up and extended above the other axle of the car, and attached to a frame-work, F. G is a spring, which may be an elliptic band-spring, a flexible rubber spring, or any other desirable form. This spring is compressed whenever the rack-bar is moved backward by its engagement with the pinion, and constitutes the brake for stopping the car. H are extensions of the frame-work F, which terminate in pawls $c$ that engage with the ratchet-wheels I on the opposite side of the axle. The said pawls are operated by means of a hand-lever, $d'$, and a crank-shaft, $e$, for engagement or disengagement with the ratchets, their connection with the crank-shaft being a slotted one to admit of the longitudinal movement of the frame-work and pawls.

When the car is stopped by the engagement of the rack and pinion, and the consequent compression of the spring, the pawls are immediately applied through their hand-levers to lock the car in a stationary position, and prevent retrograde motion of the same from the reaction of the spring. Now, when the rack is released from its pinion the wheels are started in their revolution in the direction in which they were moving before the brake was applied.

The devices as thus described are especially applicable to horse or street cars, but may be applied to any kind of a railway-car, and by means of this arrangement the very injurious and exhausting strain upon the horses at starting is almost entirely obviated.

Having thus described my invention, what I claim as new, is—

1. The combination of the car-axle, having pinion D, the rack-bar E, the spring G, the frame-work, having pawls $c$ upon the opposite side of the car-axle from the rack, and the ratchet-wheels I, substantially as and for the purpose set forth.

2. The combination of pinion D, rack-bar E, spring G, frame F, having pawls $c$, ratchet-wheels I, hand-levers $a$ and $d$, and crank-shafts $b$ and $e$, all substantially as and for the purpose set forth.

The above specification of my invention signed by me this 23d day of March, 1875.

ABSALOM B. SHARP.

Witnesses:
SOLON C. KEMON,
CHAS. A. PETTIT.